(12) United States Patent
Pedersen

(10) Patent No.: US 8,963,765 B1
(45) Date of Patent: Feb. 24, 2015

(54) SYSTEM AND METHOD FOR DETECTING USE OF BOOSTER ROCKETS BY BALLISTIC MISSILES

(75) Inventor: Richard N. Pedersen, Toms River, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 916 days.

(21) Appl. No.: 12/967,149

(22) Filed: Dec. 14, 2010

(51) Int. Cl.
*G01S 7/42* (2006.01)
*G01S 13/00* (2006.01)
*G06G 7/80* (2006.01)
*G01S 13/72* (2006.01)

(52) U.S. Cl.
CPC ..................... *G01S 13/72* (2013.01)
USPC ............... 342/95; 342/13; 342/90; 342/94; 235/400; 235/411; 235/412; 235/413; 235/417

(58) Field of Classification Search
USPC ............ 342/13–20, 90, 94–97, 175; 235/400, 235/411–417
See application file for complete search history.

(56) References Cited

U.S. PATENT DOCUMENTS

| | | | | |
|---|---|---|---|---|
| 3,290,599 A * | 12/1966 | Vann | .............................. | 342/175 |
| 3,848,129 A * | 11/1974 | Figler et al. | .............. | 250/339.14 |
| 3,944,167 A * | 3/1976 | Figler et al. | .................. | 244/3.16 |
| 3,982,713 A * | 9/1976 | Martin | ........................... | 244/3.1 |
| 4,148,029 A * | 4/1979 | Quesinberry | ................. | 342/106 |
| 4,397,429 A * | 8/1983 | Fouilloy | ....................... | 244/3.11 |
| 4,456,912 A * | 6/1984 | Ensley | ............................ | 342/13 |
| 4,925,129 A * | 5/1990 | Salkeld et al. | ............... | 244/3.11 |
| 5,428,221 A * | 6/1995 | Bushman | ..................... | 250/342 |
| 5,430,448 A * | 7/1995 | Bushman | ....................... | 342/52 |
| 5,464,174 A * | 11/1995 | Laures | ......................... | 244/3.11 |
| 5,757,310 A * | 5/1998 | Millward | ........................ | 342/95 |
| 5,798,942 A * | 8/1998 | Danchick et al. | .............. | 342/96 |
| 5,842,156 A * | 11/1998 | Hong et al. | .................... | 702/179 |
| 7,026,980 B1 * | 4/2006 | Mavroudakis et al. | ......... | 342/90 |
| 7,081,849 B2 * | 7/2006 | Collins et al. | ................. | 342/160 |
| 7,181,323 B1 * | 2/2007 | Boka et al. | ........................ | 701/1 |
| 7,187,320 B1 * | 3/2007 | Yang | .............................. | 342/74 |
| 7,295,149 B1 * | 11/2007 | Wolf | ............................... | 342/90 |
| 7,394,047 B1 * | 7/2008 | Pedersen | ........................ | 244/3.1 |
| 7,411,543 B1 * | 8/2008 | Boka | ............................... | 342/90 |
| 7,473,876 B1 * | 1/2009 | Pedersen et al. | ............... | 244/3.1 |
| 7,511,252 B1 * | 3/2009 | Pedersen et al. | ............... | 244/3.1 |
| 7,626,534 B1 * | 12/2009 | Boka et al. | ...................... | 342/90 |
| 7,663,528 B1 * | 2/2010 | Malakian et al. | ............... | 342/13 |
| 7,825,848 B2 * | 11/2010 | Schoettl | .......................... | 342/62 |
| 7,875,837 B1 * | 1/2011 | Szabo et al. | .................. | 244/3.15 |
| 7,898,466 B1 * | 3/2011 | Malakian et al. | ............... | 342/95 |
| 8,083,142 B2 * | 12/2011 | Kleder | .......................... | 235/411 |
| 8,085,186 B1 * | 12/2011 | Malakian et al. | ............... | 342/95 |

(Continued)

OTHER PUBLICATIONS

U.S. Appl. No. 11/868,554, filed Oct. 8, 2007.

*Primary Examiner* — Peter Bythrow
(74) *Attorney, Agent, or Firm* — Howard IP Law Group, PC

(57) ABSTRACT

A method for tracking an object using radar includes detecting a wideband radio frequency ("RF") energy at a first radar sensor tracking the object and determining in a computer process if a booster is propelling the object based on the wideband RF energy. The object is tracked in a computer process based on a ballistic trajectory if the booster is not propelling the object, and the object is tracked in a computer process based on a non-ballistic trajectory if the booster is propelling the object.

15 Claims, 5 Drawing Sheets

(56) References Cited

U.S. PATENT DOCUMENTS

| | | |
|---|---|---|
| 8,106,340 B1 * | 1/2012 | Diaz et al. .................... 244/3.15 |
| 8,288,696 B1 * | 10/2012 | Boka et al. ................... 244/3.11 |
| 8,314,733 B1 * | 11/2012 | Malakian et al. ............... 342/95 |
| 8,358,238 B1 * | 1/2013 | Friedman ........................ 342/62 |
| 2006/0284761 A1 * | 12/2006 | Picard .......................... 342/160 |
| 2007/0295855 A1 * | 12/2007 | Lam et al. ...................... 244/3.1 |
| 2009/0236422 A1 * | 9/2009 | Kleder .......................... 235/411 |
| 2009/0322590 A1 * | 12/2009 | Schoettl ......................... 342/62 |

\* cited by examiner

SYSTEM AND METHOD FOR DETECTING USE OF BOOSTER ROCKETS BY BALLISTIC MISSILES

FIELD OF DISCLOSURE

The disclosed system and method relate to missile tracking. More specifically, the disclosed system and method relate to detecting the use of booster rockets by ballistic missiles in order to more accurately track such missiles.

BACKGROUND

Defense systems, such as Ballistic Missile Defense ("BMD") systems, typically include a radar system and a weapons system. The radar system detects and tracks objects, e.g., a missile, plane, boat, or the like, by periodically transmitting beams of electromagnetic waves in a certain direction from radar sensors. The beams of electromagnetic waves have certain sweep areas or beam widths. Objects within the beam width cause an electromagnetic wave to be reflected back towards the radar sensors. The radar system filters the received waves and uses the characteristics of the received waves to determine the location of the object as well as the object's speed and trajectory. The radar system adjusts the direction in which the radar sensors transmits the electromagnetic beam based on the location, speed, and trajectory of the object, as previously determined. In this manner, the radar system tracks a moving object.

The information gathered by the radar system is used by a weapons system for targeting of the object being tracked. An object with a ballistic missile trajectory primarily moves under the influence of gravity and atmospheric friction. Consequently, the tracking and targeting of a ballistic missile is based on the well-understood laws of motion that apply to such trajectories. However, some ballistic missiles include multi-stage booster rockets that are sequentially or periodically activated. The use of such multi-stage boosters significantly complicates the tracking of the ballistic missile since the radar and tracking systems do not know the time at which a booster is activated, the time at which a booster is deactivated, and the thrust provided to the missile by the booster.

Accordingly, an improved system and method for determining if a booster rocket is used by a ballistic missile are desirable.

SUMMARY

A method for tracking an object using radar is disclosed that includes detecting a wideband radio frequency ("RF") energy at a first radar sensor tracking the object and determining in a computer process if a booster is propelling the object based on the wideband RF energy. The object is tracked in a computer process based on a ballistic trajectory if the booster is not propelling the object, and the object is tracked in a computer process based on a non-ballistic trajectory if the booster is propelling the object.

Also disclosed is a radar system that includes at least one radar sensor configured for transmitting and receiving phased-arrayed signals, a computer readable storage medium, and a processor in signal communication with the at least one radar sensor and the computer readable storage medium. The processor is configured for determining if a first object is being propelled by a booster if wideband radio frequency (RF) received at the at least one radar sensor is greater than a threshold value stored in the computer readable storage medium, tracking the first object based on a ballistic trajectory if the booster is not propelling the object, and tracking the first object based on a non-ballistic trajectory if the booster is propelling the object.

Another method is disclosed in which a first phased-arrayed signal is transmitted from at least one radar sensor, a reflection of the first phased-arrayed signal is at the at least one radar sensor, and the reflection of the first phased-arrayed signal is analyzed in a computer process to determine at least one of a velocity and a position of the object. Wideband radio frequency (RF) energy is detected in a computer process at the at least one radar sensor tracking the object, and a determination is made in a computer process if a booster is propelling the object based on the wideband RF energy. The object is tracked in a computer process based on a ballistic trajectory if the booster is not propelling the object, and the object is tracked in a computer process based on a non-ballistic trajectory if the booster is propelling the object.

DETAILED DESCRIPTION

Figure 1A:
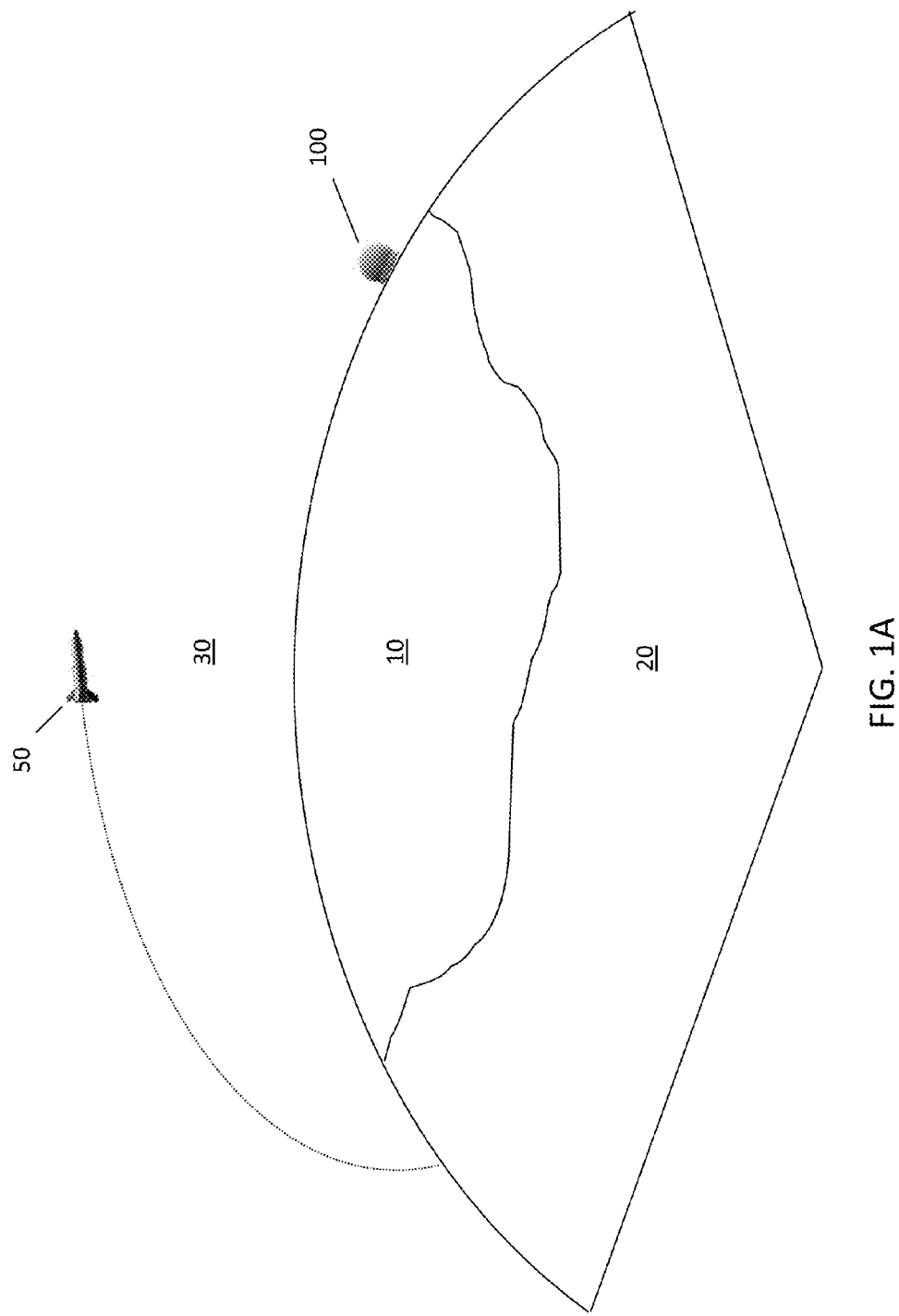
FIG. 1A is a schematic representation of a ballistic missile defense system tracking a missile.

FIG. 1A illustrates one example of a target 50, such as a ballistic missile, being tracked by a ballistic missile defense ("BMD") system 100. BMD system 100 may be a phased-array radar system including a plurality of sensors fixedly mounted to a support structure (not shown) so that they do not rotate, with respect to the support structure. Sensors of BMD system 100 may be located on land 10, water 20, or air/space 30 as will be understood by one skilled in the art. Examples of land-based sensors include, but are not limited to, a Terminal High Altitude Area Defense radar manufactured by Lockheed Martin Space Systems Company and a PAVE Phased Array Warning System manufactured by the Raytheon Company. An example of a water-based sensor includes, but is not limited to, an AN/SPY-1 radar manufactured by Lockheed Martin Company. An example of an air-based sensor includes, without limitation, an Airborne Warning and Control System ("AWACS") radar manufactured by the Northrop Grumman Corporation.

Figure 1B:
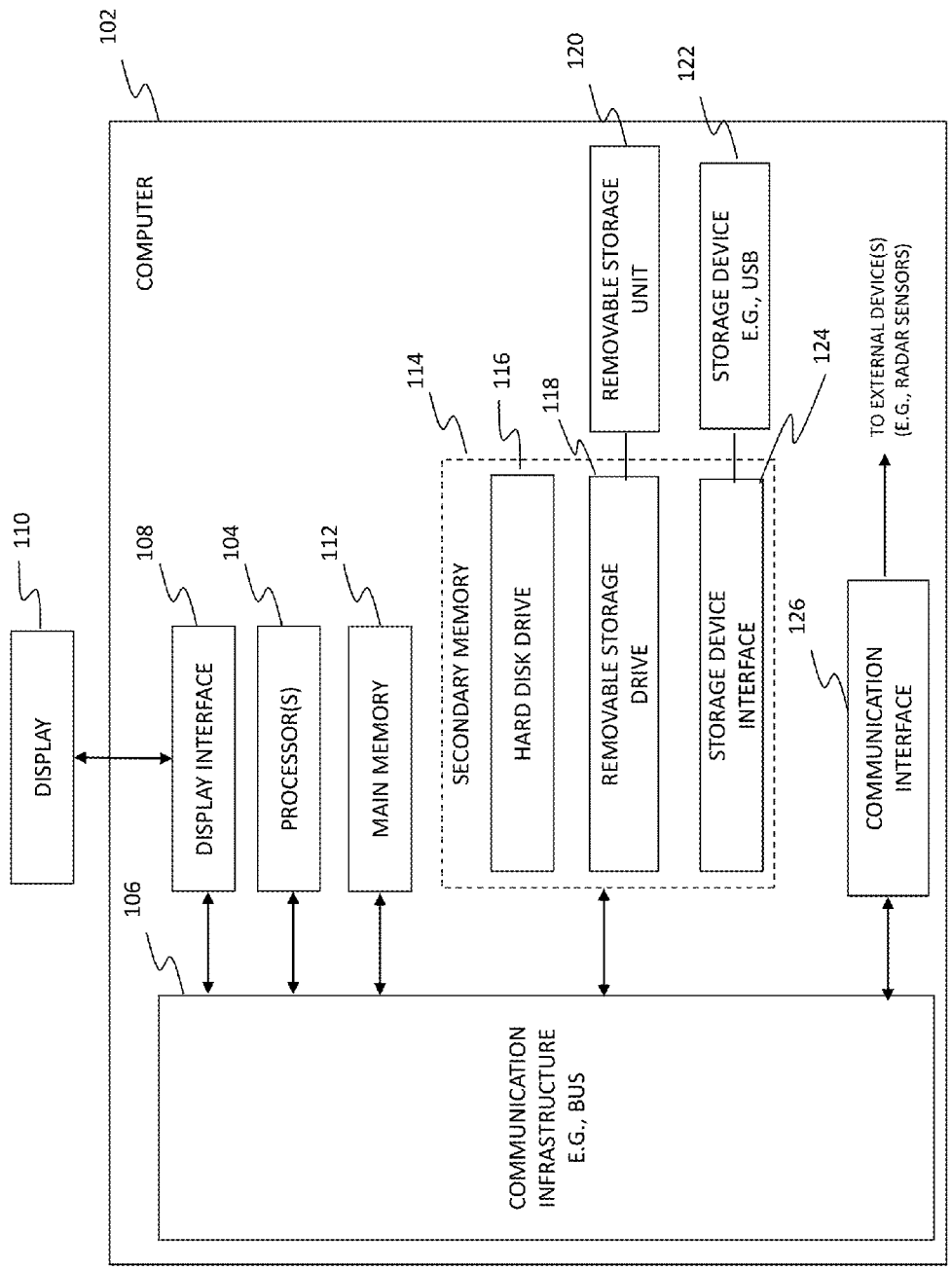
FIG. 1B is a block diagram one example of an architecture of a computer system of the ballistic missile defense system illustrated in FIG. 1A.

FIG. 1B illustrates the architecture of one example of a computer system 102 of BMD system 100. As shown in FIG. 1B, computer system 102 may include one or more processors 104, which may be configured to run a multitasking operating system. In one embodiment, the processors 104 include a weapon targeting processor, a radar processor, a tactical decision processor, and an algorithm processor. However, one skilled in the art will understand that fewer or more processors may be implemented in BMD system 100. The one or more processors 104 are connected to a communication infrastructure 106 (e.g., a communications bus, crossover bar, or network). After reading this description, it will be apparent to one skilled in the art how to implement the method using computer systems with different architectures.

Computer system 102 includes a display interface 108 that forwards graphics, text, and other data from the communication infrastructure 106 (or from a frame buffer not shown) for display on a display unit 110.

Computer system 102 also includes a main memory 112, such as a random access memory ("RAM"). Computer system 102 also includes a secondary memory 114, which may be a more persistent memory than main memory 112, such as a read only memory ("ROM"). Secondary memory 114 may include, for example, a hard disk drive 116 and/or removable storage drive 118, representing a floppy disk drive, a magnetic tape drive, an optical disk drive, ZIP™ drive, and/or other like memory devices. Removable storage drive 118 reads from and/or writes to a removable computer readable storage unit 120 as will be understood by one skilled in the art. Removable computer readable storage unit 120 represents a floppy disk, magnetic tape, optical disk, ZIP™ disk, or the like, which is read by and written to by removable storage drive 118. Removable computer readable storage unit 120 may have computer software and/or data stored therein.

In some embodiments, secondary memory 114 may include other similar devices for allowing computer programs or other instructions to be loaded into computer system 102. Such devices may include, for example, a removable storage unit 122 and a corresponding interface 124. Examples of such a removable storage unit 122 and corresponding interface 124 may include a universal serial bus ("USB") memory device and corresponding interface, e.g., a USB port.

Computer system 102 also includes a communications interface 126, which allows software and data to be transferred between computer system 102 and external devices, such as radar sensors (not shown) or other remote computer terminals. Examples of communications interface 126 may include a modem, a network interface (such as an Ethernet card), a communications port, a Personal Computer Memory Card International Association ("PCMCIA") slot and card, a wireless network card, or the like. Software and data transferred via communications interface 126 are in the form of signals which may be electronic, electromagnetic, optical, or other signals capable of being received by communications interface 126. These signals are provided to communications interface 126 via a communications path (e.g., channel), which may be implemented using wire or cable, fiber optics, a telephone line, a cellular link, a radio frequency ("RF") link and other communication channels.

In this document, the terms "computer program medium" and "computer readable storage medium" refer to media such as removable storage drive 118, a hard disk installed in hard disk drive 116, and signals. These computer program products provide software to computer system 102. Computer programs (also referred to as computer control logic) are stored in main memory 112 and/or secondary memory 114. Computer programs may also be received via communications interface 126. Such computer programs, when executed by the one or more processors 104, enable computer system 102 to perform the methods described herein.

In an embodiment where the method is implemented using software, the software may be stored in a computer readable storage medium, e.g., main memory 112 and/or secondary memory 114, and loaded into computer system 102 using removable storage drive 118, hard drive 116, or communications interface 126. The software, when executed by the one or more processors 104, causes the one or more processors 104 to perform the functions of the method described herein.

In another embodiment, the method is implemented primarily in hardware using, for example, hardware components such as application specific integrated circuits ("ASICs"). Implementation of the hardware state machine so as to perform the functions described herein will be apparent to persons skilled in the art. In yet another embodiment, the method is implemented using a combination of both hardware and software.

As will be understood by one skilled in the art, BMD system 100 is configured to simultaneously track and target a plurality of missiles in an active mode. The manner and frequency with which BMD system 100 tracks and targets a missile, or other object (i.e., plane, boat, etc.), in the active mode may vary depending on the type of flight of the object. For example, if a missile is being propelled by a booster, then BMD system 100 needs to more frequently monitor the travel of the missile compared to a missile with a ballistic trajectory, i.e., a trajectory primarily being affected by gravity and friction, since the path in which an object moves with a ballistic trajectory is well-understood and can be accurately determined.

Figure 2:
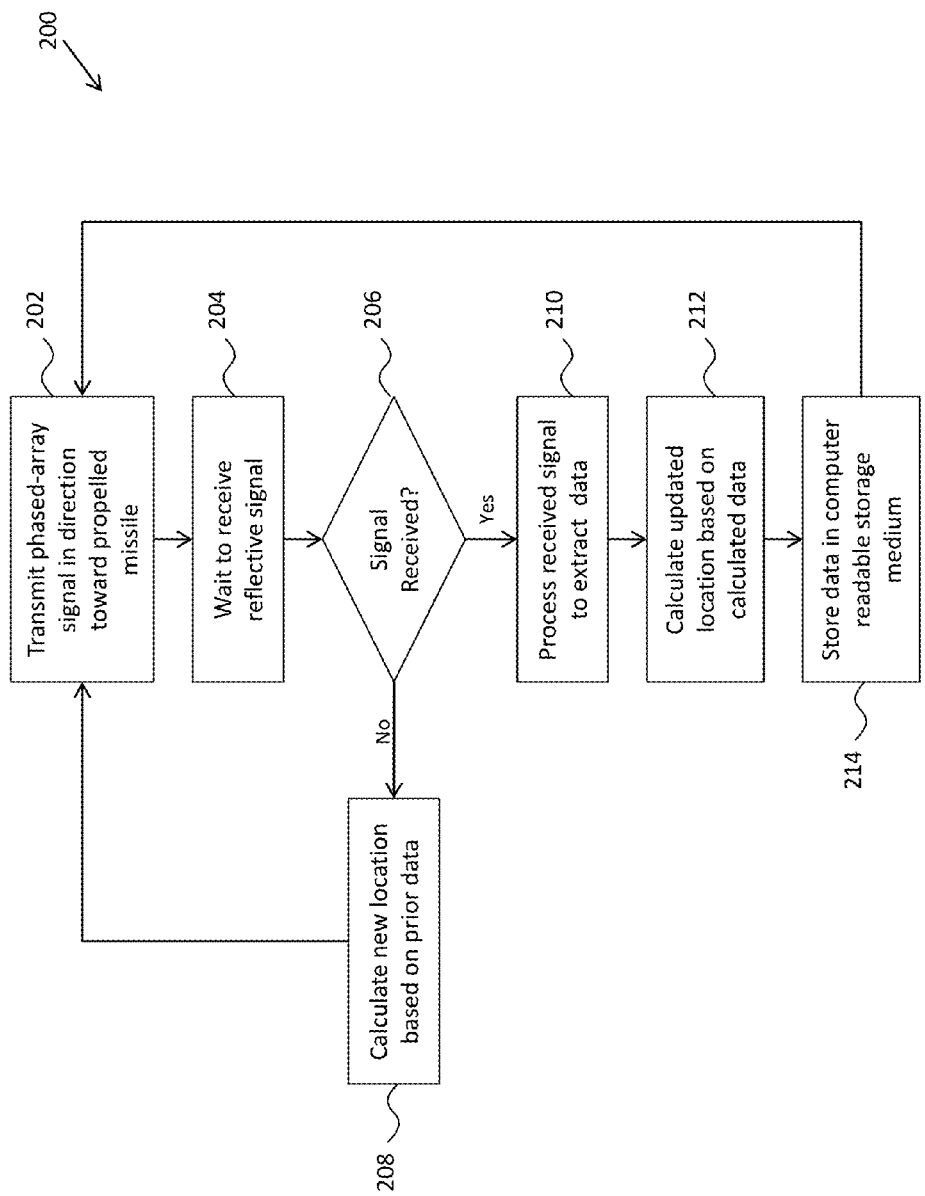
FIG. 2 is a flow diagram of one example of a method of tracking a missile being propelled by a booster performed by the missile defense system illustrated in FIG. 1A.

FIG. 2 is a flow diagram illustrating one example of a method 200 for tracking a ballistic missile propelled by a booster, that is performed by BMD system 100. At block 202, BMD system 100 transmits an electronically steered beam (phased-array signal) in a direction where the missile is believed to be, and then waits to receive a reflected signal at block 204. At decision block 206, BMD system 100 determines if the reflected signal has been received. If a reflected signal has not been received, then BMD system 100 calculates a new location for the missile based on the prior computed data, which may be stored in a computer readable storage medium such as main memory 112 and/or secondary memory 114 at block 208. BMD system 100 then returns to block 202 where another phased-array signal is transmitted in the direction in which the missile is believed to be located based on the calculations at block 208.

If BMD system 100 determines that a reflected signal has been received at decision block 206, then BMD system 100 proceeds to block 210 where the received signal undergoes signal processing. For example, BMD system 100 calculates the position of the missile in three-dimensions, the velocity of the missile in three-dimensions, and the acceleration of the missile in three-dimensions. Examples of such calculations and algorithms that may be performed by BMD system 100 are described in commonly owned U.S. patent application Ser. No. 11/868,554, titled "Template Updated Boost Algorithm"; U.S. Pat. No. 7,511,252, titled "Multihypothesis Threat Missile Propagator for Boost-Phase Missile Defense"; U.S. Pat. No. 7,411,543, titled "Maximum-Likelihood Rocket Identifier"; U.S. Pat. No. 7,026,980, titled "Missile Identification and Tracking System and Method"; and U.S. Pat. No. 7,181,323, titled "Computerized Method for Generating Low-Bias Estimates of Position of a Vehicle from Sensor Data", the entire disclosures of which are herein incorporated by reference.

At block 212, BMD system 100 calculates an updated location of the missile based on the data extracted from the reflected signal at block 210. The updated data for the tracked missile may include three-dimensional position, velocity, and acceleration data. The updated data is stored in a computer readable storage medium, such as, main memory 112 and/or secondary memory 114 at block 214. The updated missile data may be provided to a targeting sub-system of BMD system 100 for targeting and guiding an interceptor as will be understood by one skilled in the art. Examples of such systems and methods are described in commonly owned U.S. Pat. No. 7,473,876, titled "Boost Phase Intercept Missile Fire Control System Architecture", and U.S. Pat. No. 7,394,047, titled "Interceptor Guidance for Boost-Phase Missile Defense", the entireties of which are herein incorporated by reference. BMD system 100 proceeds to block 202 where it transmits a phased-array signal based on the updated data.

Figure 3:
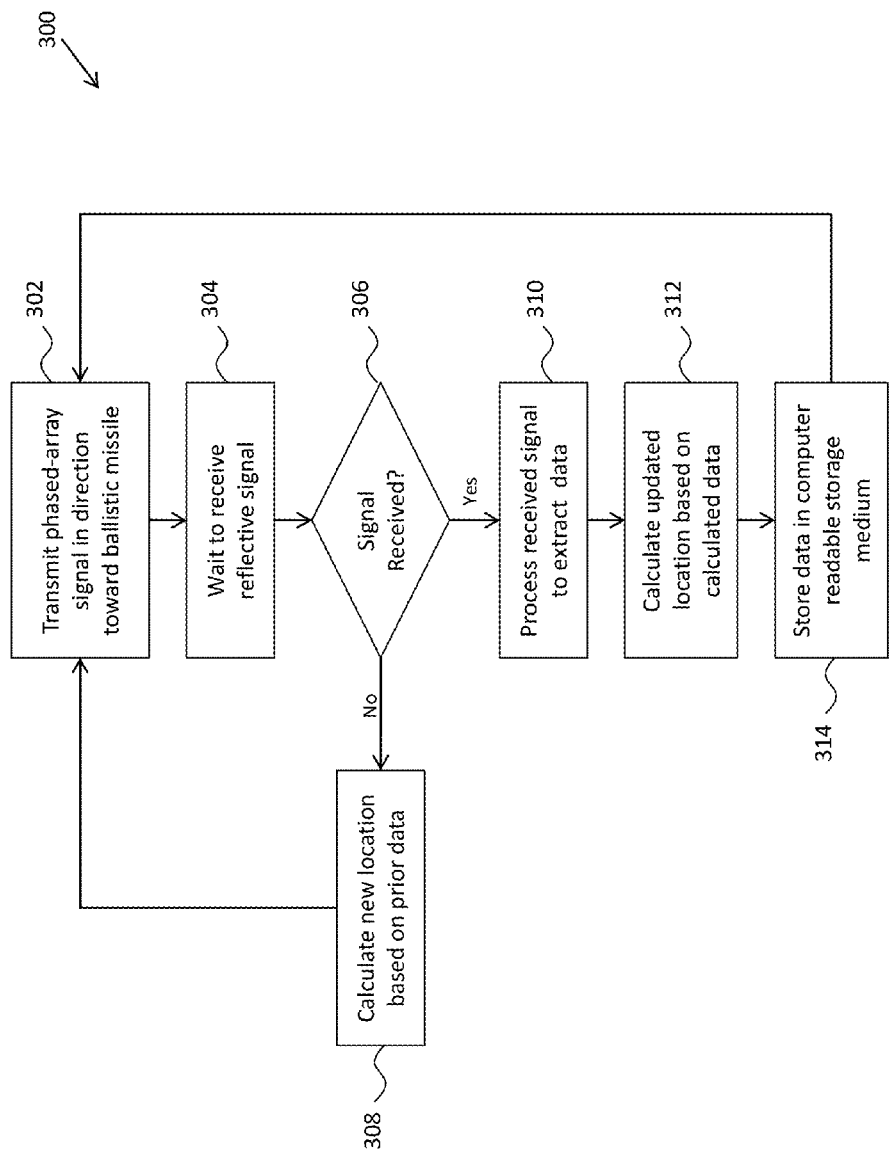
FIG. 3 is a flow diagram of one example of a method of tracking a missile having a ballistic trajectory performed by the ballistic missile defense system illustrated in FIG. 1A.

The tracking of missile having a ballistic trajectory, i.e., not being propelled by a booster, may be similar to the tracking of a missile being propelled by a booster illustrated in FIG. 2. For example, at block 302 in FIG. 3, BMD system 100 transmits a phased-array signal in a direction towards a missile having a ballistic trajectory. BMD system 100 waits a predetermined period of time to receive a reflection of the transmitted signal at block 304, and determines whether or not a reflected signal has been received at decision block 306.

If the reflected signal has not been received, then BMD system 100 proceeds to block 308 where it calculates a new location based on prior position, velocity, and acceleration data that may have been stored in a computer readable storage medium such as main memory 112 and/or secondary memory 114. The calculations performed by BMD system 100 to determine the location of a missile having a ballistic trajectory are comparatively less complex than the calculations for computing a next location for a missile being propelled by a booster since there is greater certainty as to how the object is traveling and therefore are fewer variables that BMD system 100 needs to take into account. One example of a method of calculating a position and track for an object having a ballistic trajectory is described in U.S. Patent Application Publication No. 2009/0236422, titled "System and Method for Target Tracking", which corresponds to U.S. patent application Ser. No. 11/935,685, the entirety of which is herein incorporated by reference. BMD system 100 then returns to block 302 where a phased-array signal is transmitted in a direction in accordance with the calculations at block 308.

If BMD system 100 determines that a reflected signal is received at block 306, then the reflected signal undergoes signal processing at block 310. For example, BMD system 100 calculates the position of the missile in three-dimensions, the velocity of the missile in three-dimensions, and the acceleration of the missile in three-dimensions. At block 312, BMD system 100 calculates an updated location of the missile with the ballistic trajectory based on the data extracted from the reflected signal at block 310. The updated data for the tracked missile may include three-dimensional position, velocity, and acceleration data, and may be stored in a computer readable storage medium at block 314. Additionally, the updated missile data may be provided to the targeting subsystem of BMD system 100 for targeting and guiding an interceptor as will be understood by one skilled in the art. BMD system 100 continues to block 302 where BMD system 100 transmits a phased-array signal in the direction of the ballistic missile based on the data calculated at block 312.

In addition to the difference in complexity of the calculations performed by BMD system 100 in methods 200 and 300, the cycle time, i.e., the time between transmitting consecutive phased-array signals, may be shorter for method 200 than for method 300. The cycle time of method 300 may be greater than the cycle time of method 200 due to the fact that there is greater certainty in calculating a location of a missile or other object having a ballistic trajectory compared to calculating a location of a missile or other object being propelled by a booster rocket. The determination of the optimal reduced cycle time for a propelled target is calculated as a function of the range of accelerations a given class of targets is expected to use. For example, objects capable of being propelled with an expected maximum force that results in an acceleration several times of an acceleration imparted on an object by Earth's gravity may have a radar measurement cycle that is approximately ten times shorter than the nominal cycle time required for a non-propelled object in order for the propelled object to be tracked with the desired level of confidence for the radar system. Conversely, since the radar system can accurately predict the future position of a non-propelled target experiencing only ballistic motion, the position of such target can be confidently tracked by measuring the position of the target less often, for example, by measuring the target's position using the nominal cycle time.

BMD system 100 is also configured with a passive mode for detecting an adversary's radar system. For example, in the passive mode, the radar sensors of BMD system 100 do not transmit signals, but instead detect radio frequency ("RF") energy transmitted by an adversary's radar. The passive mode of BMD system 100 may also be utilized to advantageously detect when a ballistic missile is being propelled by a booster since the booster rocket emits substantial amounts of wideband RF energy resulting from quantum shifts in the booster motor exhaust gasses. These quantum shifts are caused by the extremely high thermal excitation to which these exhaust gasses have been subjected. For example, the extremely high thermal excitation of the variety of molecular constituents in the exhaust gasses, quanta, or photons results in the emission of electromagnetic energy covering a wide range of frequencies including a number of photons having frequencies that coincide with the range of frequencies used by phased-array radar systems in the transmission reception of their measurement pulses. Such photons have the same effect on the radar system as the reception of pulses reflected off of a target whose position is being measured by the radar system and cause the radar system's receiver to report the detection of an object.

Detecting whether or not a booster is propelling the missile enables BMD system 100 to more efficiently allocate its resources among the targets BMD system 100 is tracking. Such resources include, but are not limited to, processing power by one or more of the processors 104 and timing for transmitting and receiving phased-arrayed signals in order to track the missile.

Phased-array radar measurement resources are also conserved by detecting whether or not an object is being propelled by a booster. For example, a phased-array radar sensor of BMD system 100 focuses its transmitted beam at a particular elevation angle and a particular azimuth angle, transmits the phased-array beam through a series of RF pulses, and looks along the beam formed by the transmit azimuth and elevation angles for reflections of these pulses from one or more objects that may be present in the beam. BMD system 100 is able to determine the distance of the object(s) from the radar sensor by measuring the time between the transmission of the pulses and the reception of any reflected pulses, which are electromagnetic in nature and therefore travel at the speed of light. This computed distance, along with the azimuth and elevation angles used by BMD system 100 to transmit and receive the pulses, enables BMD system 100 to calculate the three-dimensional position of the object.

Although an electronically-steered phased-array radar beam is steered at a high rate compared to radar systems that utilize mechanically-steered beams (i.e., rotating radars), the number of beams that can by employed in any given unit is deterministic and bounded by a maximum measurement rate. In order to ensure that the full region under surveillance by BMD system 100 is being surveilled in an efficient and effective manner, the radar measurements are scheduled by BMD system 100. If an object is accelerating in an unpredictable manner, i.e., a non-ballistic trajectory, BMD system 100 schedules a certain number of measurements for that object to meet the minimum confidence level of the system.

As described above, the number of measurements for tracking an object having a non-ballistic trajectory is greater than the number of measurements for tracking an object having a ballistic trajectory. Consequently, if BMD system 100 determines that an object that previously had a non-ballistic trajectory now has a ballistic trajectory, i.e., the object is not being propelled by a booster, then BMD system 100 can reduce its scheduling utilization for tracking the object and use the previously utilized resources for tracking another object. Alternatively or additionally, BMD system 100 can passively track the target at a rate that is lower than a rate for actively tracking the object by detecting photons emitted by the object's exhaust gasses thereby reducing the measurement cycle time by eliminating the transmit portion of the measurement cycle. BMD system 100 may also be configured to track an exhaust plume, which is typically larger than the missile, using fewer measurements than actively tracking an object having a non-ballistic trajectory.

Figure 4:
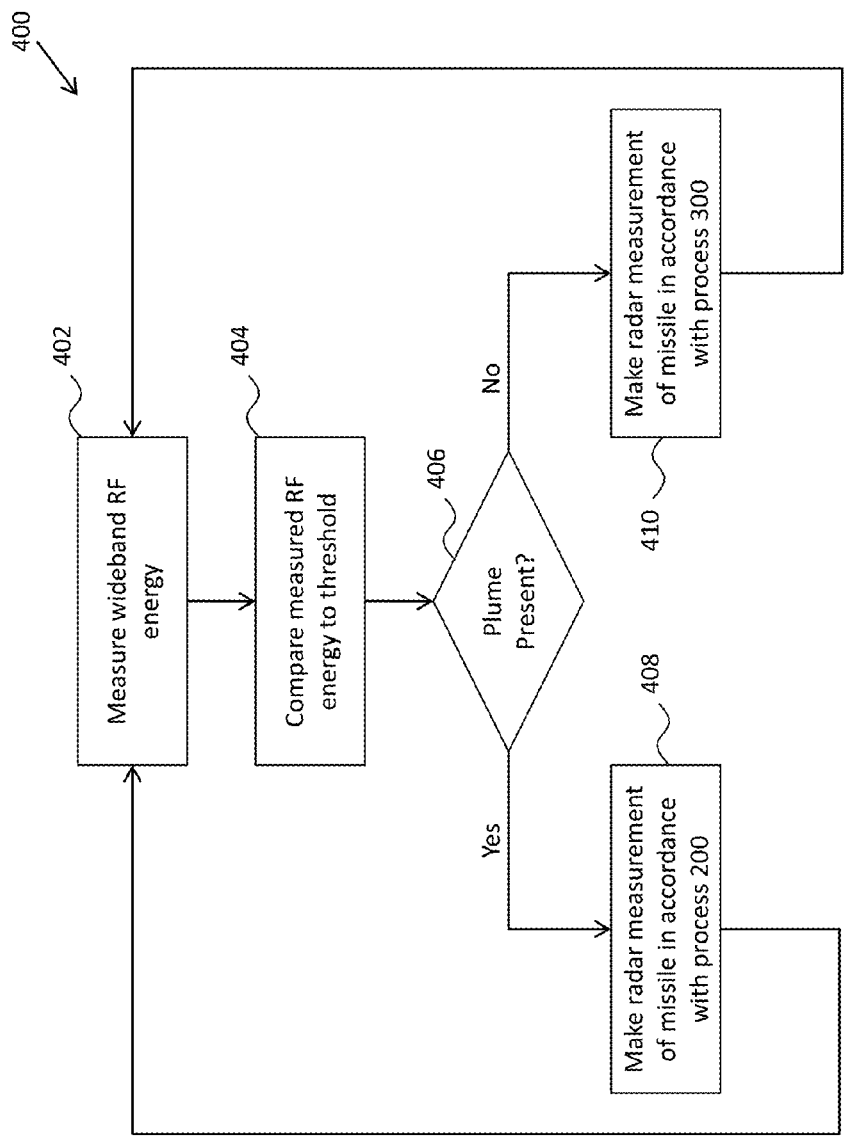
FIG. 4 is a flow diagram of one example of determining if a missile is being propelled by a booster performed by the ballistic missile defense system illustrated in FIG. 1A.

FIG. 4 is a flow diagram illustrating one example of a method 400 for determining if a booster is being used to propel a missile. One skilled in the art will understand that process 400 may performed by BMD system 100 when BMD system 100 is in the active or passive states. As shown in FIG. 4, the wideband RF energy received at a radar sensor is measured at block 402, and the measured RF energy is compared to a threshold value at block 404. As will be understood by one skilled in the art, the wideband RF energy threshold value may be stored in a computer readable storage medium of BMD system 100 such as, for example, in main memory 112 and/or in secondary memory 114.

At decision block 406, BMD system 100 determines if a plume is present behind the missile. In one embodiment, BMD system 100 determines if a plume is present behind the missile if the measured wideband RF energy is greater than the threshold value of wideband RF energy stored in the computer readable storage medium. If a plume is detected at block 406, then the radar measurements and tracking of the missile are performed in accordance with method 200 as described above since the missile is being propelled by a booster. If a plume is not detected, then the missile is not being propelled by a booster and radar measurements and tracking of the missile are performed in accordance with method 300 as described above. When BMD system 100 begins tracking the missile in accordance with method 300, it may allocate some resources, such as, for example, processing power by one or more of the processors 104 and/or timing for transmitting and receiving phased-arrayed signals in order to track the missile, for tracking another object. BMD system 100 may continue measuring the wideband RF energy to detect if a booster is propelling the missile as indicated in FIG. 4 as some missiles may include multi-stage boosters as will be understood by those skilled in the art.

The disclosed system and method enable valuable radar resources to be conserved and reallocated by determining when a missile is being propelled by a booster and when the missile has a ballistic trajectory. When it is determined that the missile is not being propelled and therefore has a ballistic trajectory, radar resources may be allocated from tracking the missile with a ballistic trajectory to tracking a missile having a non-ballistic trajectory. The result is a more efficient use of ballistic missile defense threat detection and tracking resources, thereby providing enhanced capability for the system to successfully prosecute the engagement and destruction of one or more such threats simultaneously.

The subject matter disclosed herein may be at least partially embodied in the form of computer-implemented methods and apparatus for practicing those methods. The subject matter disclosed herein may also be at least partially embodied in the form of computer program code embodied in tangible machine readable storage media, such as RAMs, ROMs, CD-ROMs, DVD-ROMs, BD-ROMs, hard disk drives, flash memories, or any other machine-readable storage medium, wherein, when the computer program code is loaded into and executed by a computer, the computer becomes an apparatus for practicing the methods disclosed herein.

As described above, the subject matter disclosed herein may be embodied at least partially in the form of computer program code, whether loaded into and/or executed by a computer, such that, when the computer program code is loaded into and executed by a computer, the computer becomes an apparatus for practicing the methods. When implemented on a general-purpose processor, the computer program code segments configure the processor to create specific logic circuits. The subject matter disclosed herein may alternatively be at least partially embodied in a digital signal processor formed of application specific integrated circuits for performing a method according to the subject matter disclosed herein.

Although the systems and methods have been described in terms of exemplary embodiments, they are not limited thereto. Rather, the appended claims should be construed broadly, to include other variants and embodiments of the disclosed systems and methods, which may be made by those skilled in the art without departing from the scope and range of equivalents of the systems and methods. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A computer implemented method for tracking an object using radar, the method comprising:
   a) receiving, in a processor of the computer, data representing a wideband radio frequency (RF) energy level of the object detected at a first radar sensor;
   b) comparing, by the processor of the computer, the data representing the wideband RF energy level detected to a predetermined non-zero threshold energy level value and determining, by the processor of the computer, if a booster is propelling the object based solely on the comparison of the data representing the wideband RF energy level detected by the first radar sensor to the predetermined non-zero threshold energy level value;
   c) responsive to a determination that the booster is not propelling the object, tracking, using a computer processor, the object at a first rate according to a ballistic trajectory; and
   d) responsive to a determination that the booster is propelling the object, tracking using a computer processor, the object at a second rate that is greater than the first rate according to a non-ballistic trajectory.

2. The method of claim 1, wherein tracking the object according to a ballistic trajectory includes:
   i) transmitting an electronically steered first phased-arrayed signal in a direction associated with an estimated position of the object;
   ii) receiving a reflection of the first phased-arrayed signal;

iii) processing the reflection of the first phased-arrayed signal to determine at least one of a velocity and a position of the object;
iv) calculating an updated estimated position of the object based on the processed reflection; and
repeating steps i), ii), iii), and iv) at the first rate.

3. The method of claim 2, wherein tracking the object according to a non-ballistic trajectory includes:
v) transmitting an electronically steered second phased-arrayed signal in a direction associated with an estimated position of the object;
vi) receiving a reflection of the second phased-arrayed signal;
vii) processing the reflection of the second phased-arrayed signal to determine at least one of a velocity and a position of the object;
viii) calculating an updated estimated position of the object based on the processed reflection; and
ix) repeating steps v), vi), vii) and viii) at the second rate that is greater than the first rate.

4. The method of claim 1, further comprising allocating at least one resource used to track the object to track a second object if the booster is not propelling the object.

5. The method of claim 1, wherein determining if the booster is propelling the object includes:
i) measuring the wideband RF energy level;
ii) comparing the measured wideband RF energy level to a threshold RF energy level; and
iii) identifying that the booster is propelling the object if the measured energy is greater than or equal to the threshold RF energy level.

6. A radar system comprising:
at least one radar sensor configured for transmitting and receiving phased-arrayed signals;
a computer readable storage medium; and
a processor in signal communication with the at least one radar sensor and the computer readable storage medium, the processor configured for:
comparing data representing the wideband radio frequency (RF) energy level detected to a non-zero threshold energy level value stored in the computer readable storage medium and determining if a first object is being propelled by a booster based solely on the comparison of the wideband radio frequency (RF) energy level received at the at least one radar sensor to the non-zero threshold energy level value;
tracking the object by the processor repeating the steps of:
transmitting a signal to the radar sensor that when received by the radar sensor causes the radar sensor to transmit an electronically steered beam;
receiving a reflected signal from the radar sensor;
processing the reflected signal to calculate at least one of a position, a velocity and an acceleration of the object;
calculating an updated position of the object based on the processed reflected signal; and
transmitting a signal to the radar sensor that when received by the radar sensor, causes the radar sensor to transmit the electronically steered beam toward the updated position, wherein calculating the updated position is based on a ballistic trajectory responsive to a determination that the booster is not propelling the object; and
calculating the updated position is based on a non-ballistic trajectory responsive to a determination that the booster is propelling the object.

7. The radar system of claim 6, wherein repeating the steps of tracking the object occurs at a first rate if it is determined that a booster is not propelling the object.

8. The radar system of claim 7, wherein
repeating the steps of tracking the object occurs at a second rate which is greater than the first rate, if it is determined that a booster is propelling the object.

9. The radar system of claim 6, wherein the processor is configured to allocate at least one resource used to track the first object to track a second object if the booster is not propelling the first object.

10. A method for tracking an object using radar, the method comprising:
a) transmitting a first phased-arrayed signal from at least one radar sensor;
b) receiving a reflection of the first phased-arrayed signal at the at least one radar sensor;
c) analyzing the reflection of the first phased-arrayed signal in a computer process to determine at least one of a velocity and a position of the object;
d) detecting by a computer processor wideband radio frequency (RF) energy level at the at least one radar sensor tracking the object;
e) comparing, by the computer processor, the data representing the wideband RF energy level detected to a non-zero threshold energy level value and determining if a booster is propelling the object based solely on the comparison of the wideband RF energy level to the non-zero threshold RF energy level value;
f) tracking the object by, in the processor of the computer, repeating the steps of:
transmitting a signal to the radar sensor that when received by the radar sensor causes the radar sensor to transmit an electronically steered beam;
receiving a reflected signal from the radar sensor;
processing the reflected signal to calculate at least one of a position, a velocity and an acceleration of the object;
calculating an updated position of the object based on the processed reflected signal; and
transmitting a signal to the radar sensor that when received by the radar sensor, causes the radar sensor to transmit the electronically steered beam toward the updated position, wherein
calculating the updated position is based on a ballistic trajectory responsive to a determination that the booster is not propelling the object; and
calculating the updated position is based on a non-ballistic trajectory responsive to a determination that the booster is propelling the object.

11. The method of claim 10, wherein if it is determined that a booster is not propelling the object, repeating the steps of tracking the object at a first rate, if it is determined that a booster is propelling the object, repeating the steps of tracking the object at a second rate.

12. The method of claim 11, wherein the first rate is slower than the second rate.

13. The method of claim 10, further comprising:
g) allocating at least one resource used to track the object to track a second object if the booster is not propelling the first object.

14. The method of claim 10, wherein determining if the booster is propelling the object includes:
i) measuring the wideband RF energy level;
ii) comparing the measured wideband RF energy level to a threshold energy level; and iii) identifying that the booster is propelling the object if the measured energy level is greater than or equal to the threshold energy level.

15. The method of claim 10, wherein tracking the object based on a non-ballistic trajectory includes:
determining a velocity, an acceleration, and a location of the object in three dimensions;
calculating an estimated location of the object at a time in the future; and
transmitting a second phased-arrayed signal from the at least one radar sensor in a second direction that is different from a first direction in which the first phased-arrayed signal was transmitted, the second direction based on the estimated location of the object.

\* \* \* \* \*